United States Patent
Kato et al.

(10) Patent No.: US 7,215,470 B2
(45) Date of Patent: May 8, 2007

(54) REAR PROJECTOR

(75) Inventors: Shigeki Kato, Chino (JP); Haruyoshi Yamada, Shiojiri (JP); Shigeyuki Seki, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 17 days.

(21) Appl. No.: 10/779,678

(22) Filed: Feb. 18, 2004

(65) Prior Publication Data

US 2004/0233395 A1 Nov. 25, 2004

(30) Foreign Application Priority Data

Mar. 24, 2003 (JP) .............................. 2003-080734

(51) Int. Cl.
*G03B 21/56* (2006.01)
*G03B 21/22* (2006.01)
(52) U.S. Cl. ........................................ 359/443; 353/74
(58) Field of Classification Search ................ 359/443, 359/449; 353/74, 79, 47; 348/839, 840, 348/823
See application file for complete search history.

(56) References Cited

U.S. PATENT DOCUMENTS 4,381,421 A * 4/1983 Coats et al. ................ 348/823
5,206,760 A * 4/1993 Nakashima et al. ........ 359/443
5,548,350 A * 8/1996 Yamada et al. ............. 359/443
5,580,145 A * 12/1996 Yamada et al. ............... 353/74

FOREIGN PATENT DOCUMENTS

JP 07-114101 5/1995
JP A 2002-296678 10/2002

\* cited by examiner

*Primary Examiner*—Christopher Mahoney
(74) *Attorney, Agent, or Firm*—Oliff & Berridge, PLC

(57) ABSTRACT

There is provided a rear projector capable of preventing entry of dust. A cabinet of the rear projector has a front side thereof formed with an opening. A screen panel slightly larger in size than the opening is attached to the front side of the cabinet such that the opening edge portion of the opening of the cabinet and the periphery of the screen panel are opposed to each other. The screen panel receives projection light projected from behind for image display, and thereby displays an image thereon. A projector unit is disposed within the cabinet, for projecting the projection light. A dust-proofing sealing member is disposed between the periphery of the screen panel and the opening edge portion, the screen panel is attached to the housing.

5 Claims, 3 Drawing Sheets

REAR PROJECTOR

BACKGROUND OF THE INVENTION

1 Field of the Invention

The present invention relates to a rear projector which displays an image on a screen panel by projected projection light from behind the screen panel.

2 Description of the Related Art

With proliferation of digital broadcasting and widespread use of digital AV (audio-visual) devices in recent years, there is an increasing demand for displays capable of displaying images of high quality on a large screen. As a display of this kind, the present assignee has already proposed a rear projector which displays images by the rear projection method, in Japanese Laid-Open Patent Publication (Kokai) No. 2002-296678. In the rear projector, part of which is shown in FIG. 4, a projection device disposed within a housing 13 modulates incident light (white light) from a light source lamp into projection light for image display, based on image information inputted from an external image information output device, and projects the projection light onto a screen panel 20 disposed at the front of the housing 13, from behind, to thereby display images on the screen panel. In this case, the projection device is provided with modulation means for modulating the incident light and a cooling fan for cooling the light source lamp and the modulation means.

In general, the screen panel of a rear projector of the above mentioned kind thermally expands vertically and laterally according to a rise in temperature thereof caused by projected of projection light. For this reason, if the screen panel is configured such that its periphery is fixed to the housing, expansion of the screen panel is inhibited, which can cause warpage of the screen panel. To overcome this problem, in the proposed rear projector, the screen panel 20 is attached to the housing 13, as shown in FIG. 4, such that the screen panel 20 is held by the housing 13 in an expandable fashion without having its periphery fixed to the housing 13. In this case, a protective tape for preventing scratching is affixed to the periphery of the screen panel (or to the edge portion of an opening of the housing for receiving the screen panel) so as to prevent the screen panel from being scratched by sliding contact between the periphery of the screen panel and the edge portion of the opening of the housing when the screen panel expands. Thus, distortion of the screen panel due to its expansion and scratched on the periphery of the screen panel are prevented.

However, from the study of the proposed rear projector, the present inventors found out the following point for improvement: In this rear projector, because the composition in which the screen panel is maintained while possible to be extended is adopted, a gap is formed between the periphery of the screen panel 20 and the edge portion of the opening of the housing 13 as illustrated in FIG. 4. Further, in the rear projector, since the modulation means and the light source lamp are cooled by air blown from the cooling fan, there is a flow of air within the housing. As a result, dust can enter the housing together with air through the gap formed between the screen panel and the housing. Therefore, in the rear projector, the dust having entered the housing through the gap can be deposited on the projection device and the rear surface of the screen panel. This is the point desired to be improved in the proposed rear projector.

SUMMARY OF THE INVENTION

The present invention has been made in view of the above described point for improvement, and a main object of the present invention is to provide a rear projector capable of preventing entry of dust.

To attain the above object, the present invention provides a rear projector comprising a housing that has a front side thereof formed with an opening defined by an opening edge portion of the housing, a screen panel that is slightly larger in size than the opening of the housing and attached to the front side of the housing such that the opening edge portion of the opening of the housing and a periphery of the screen panel are opposed to each other, the screen panel receiving projection light projected from a rear side thereof for image display, and thereby displaying an image thereon, a projection mechanism that is disposed within the housing, for projecting the projection light, and a dust-proofing elastic member that is disposed between the periphery of the screen panel and the opening edge portion, the screen panel is attached to the front side of the housing.

According to this rear projector, the screen panel is attached to the front side of the housing the dust-proofing elastic member between the periphery of the screen panel and the opening edge portion of the opening of the housing. Therefore, even when the screen panel thermally expands, a gap cannot be formed between the screen panel and the housing, which makes it possible to reliably prevent entry of dust into the housing, and hence prevent deposition of dust on the projection mechanism and the rear surface of the screen panel.

Preferably, the elastic member is formed of a closed-cell expanded resin. According to this preferred embodiment, since cells are separate from each other within the closed-cell expanded resin, it is possible to reliably prevent dust from passing through the cells into the inside of the housing. Further, the closed-cell expanded resin has a high elastic deformation rate, so that even when the screen panel largely expands, the closed-cell expanded resin is held in intimate contact with the periphery of the screen panel and the opening edge portion of the housing. Consequently, even when the screen panel largely expands, it is possible to reliably prevent separation of the elastic member from the periphery of the screen panel and the opening edge portion of the housing, thereby preventing a gap from being formed between the periphery of the screen panel and the elastic member or between the opening edge portion of the housing and the elastic member.

BRIEF DESCRIPTION OF THE DRAWINGS

These and other objects and features of the present invention will be explained in more detail below with reference to the attached drawings, wherein.

DESCRIPTION OF THE PREFERRED EMBODIMENT

Figure 1:
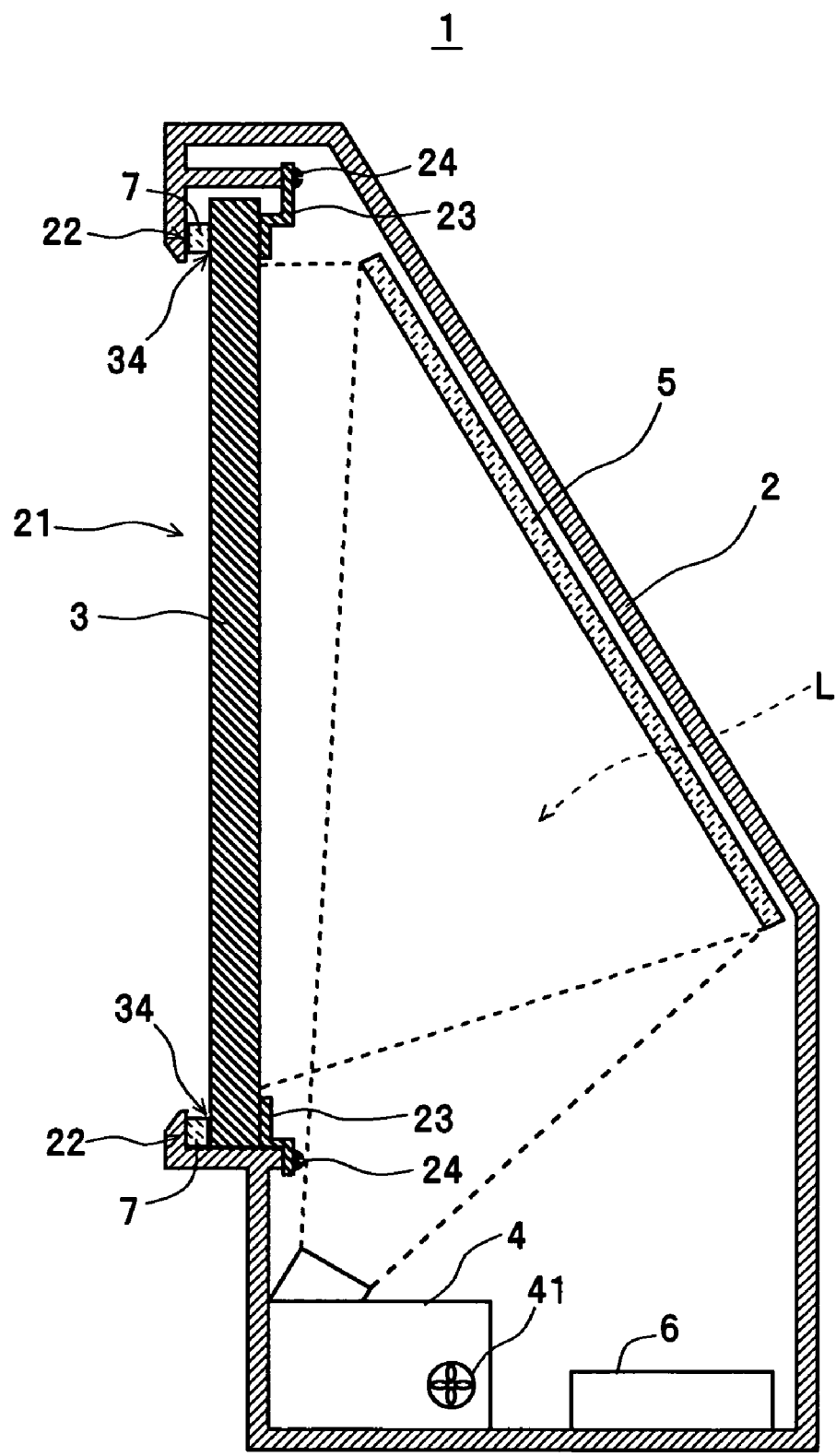
FIG. 1 is a side cross-sectional view schematically showing the arrangement of a television.

The invention will now be described with reference to the accompanying drawings showing a preferred embodiment thereof. First, a description will be given of the arrangement of a rear projection television (hereinafter also simply referred to as "the television") 1. As shown in FIG. 1, the television 1 as an example of the rear projector of the present invention is comprised of a cabinet (housing) 2, a screen panel 3, a projector unit 4, a mirror 5, a control unit 6, and a sealing member 7. The television 1 is capable of displaying various kinds of images, such as TV(television) pictures. The cabinet 2 is in the form of a box having a sloped surface on its rear side and a front side thereof formed with an opening 21 having a rectangular shape as viewed from the front of the cabinet 2.

Figure 2:
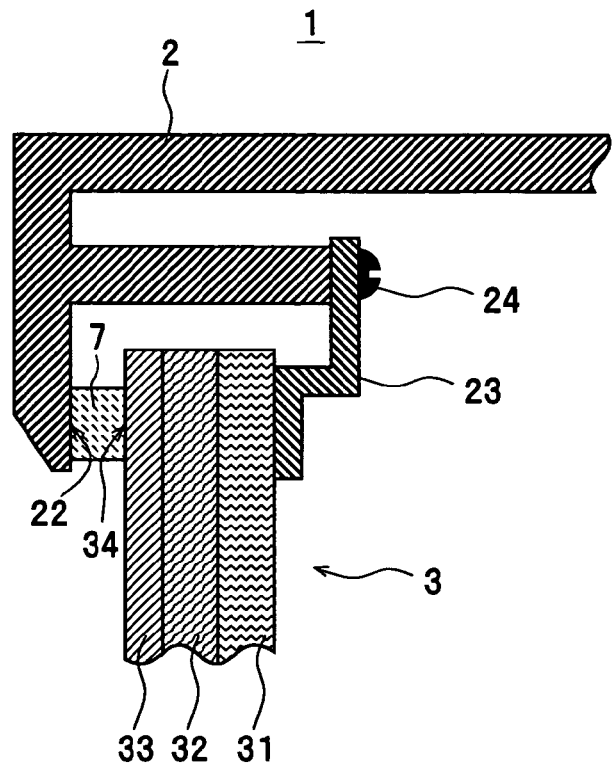
FIG. 2 is a side cross-sectional view showing the construction of part of the television, constituted by a cabinet, a screen panel, and a sealing member.

The screen panel 3 is formed to have a rectangular shape, as viewed from the front of the cabinet 2, which is slightly larger in size than the opening 21. The screen panel 3 is attached to an inner wall surface of the front side (corresponding to the front side of the present invention) of the cabinet 2, as shown in FIGS. 1 and 2, such that a periphery 34 of the screen panel 3 is opposed to an opening edge portion 22 of the opening 21 of the cabinet 2. Further, the screen panel 3 is secured to the cabinet 2 by hold metal fittings 23 and screws 24 from right to left or up and down at four locations, in a manner pressed forward by the hold metal fittings 23 and the screws 24 such that the sealing member 7 is between the periphery 34 and the opening edge portion 22. As shown in FIG. 2, the screen panel 3 is comprised of a Fresnel lens 31, a lenticular lens 32, and a resin plate 33. The screen panel 3 displays various images thereon by receiving projection light L projected from behind, i.e. from the rear side thereof. In this case, the Fresnel lens 31 converts the projection light L into parallel light, and the lenticular lens 32 converts the parallel light into magnified (diffused) light. The resin plate 33 transmits the magnified light therethrough as well as functions as a protective plate for protecting the lenticular lens 32.

The projector unit 4, which corresponds to a projection mechanism of the present invention, is disposed, as shown in FIG. 1, on the inner bottom surface of the cabinet 2, for projecting toward the mirror 5 projection light L modulated based on an image signal outputted from the control unit 6. More specifically, the projector unit 4 is comprised e.g. of a light source lamp, not shown, modulation means (e.g. a liquid crystal light valve comprised of a liquid crystal panel, a incident-side polarizing plate, and a irradiation-side polarizing plate), not shown, for modulating white light from the light source lamp into the projection light L, and a projection lens, not shown, for magnifying the projection light L and then projecting the same. Further, the projector unit 4 comprises a cooling fan 41 for cooling the modulation means and the light source lamp. The mirror 5 is disposed at an upper rear location within the cabinet 2, as shown in FIG. 1, and reflects the projection light L from the projector unit 4 toward the screen panel 3.

The control unit 6 is comprised of a tuner, an IF circuit, an audio detection circuit, a video detection circuit, an amplifier circuit, and a CPU (none of which are shown), for example, and controls the operation of the projector unit 4 in a centralized operation. Further, the control unit 6 extracts a broadcast signal of a frequency corresponding to a channel selected e.g. by operation of a remote control, not shown, and outputs an image signal to the projector unit 4 and an audio signal to an audio output section, not shown.

The sealing member 7, which corresponds to an elastic member of the present invention, is formed of a closed cell sponge (closed-cell expanded resin) excellent in dust-proofing capability and having a high elastic deformation rate. The sealing member 7 is formed to have a hollow rectangular shape, as viewed from its front, with a central opening slightly larger in size than the opening 21, and have a rectangular shape in cross section of each side portion thereof. The sealing member 7 extends along the entire opening edge portion 22 of the cabinet 2 (the periphery 34 of the screen panel 3). As shown in FIG. 2, the sealing member 7 is interposed between the periphery 34 of the screen panel 3 and the opening edge portion 22 of the cabinet 2 such that the lower side thereof is supported by the cabinet 2 and a gap is formed between the upper side thereof and the cabinet 2. The sealing member 7 is pressed by the screen panel 3 whereby it is held in intimate contact with the periphery 34 of the screen panel 3 and the opening edge portion 22 of the cabinet 2.

Next, the overall operation of the television 1 will be described with reference to the drawings. In the television 1, when a main switch, not shown, is turned on, supply of power to the projector unit 4 is started. When the power is supplied to the projector unit 4, the light source lamp of the projector unit 4 illuminates to project incident light L (white light), and the cooling fan 41 starts blowing. Then, when a channel is selected by operation of the remote control, the control unit 6 extracts a broadcast signal of a frequency corresponding to the selected channel, and outputs an audio signal and a video signal. In response to this, the projector unit 4 modulates the projection light L from the light source lamp into incident light L for image display, based on the video signal. The modulated projection light L is reflected by the mirror 5 and projected onto the rear surface of the screen panel 3, as shown in FIG. 1. Thus, an image is displayed on the screen panel 3. On the other hand, the audio output section, not shown, outputs sound based on the audio signal.

Figure 3:
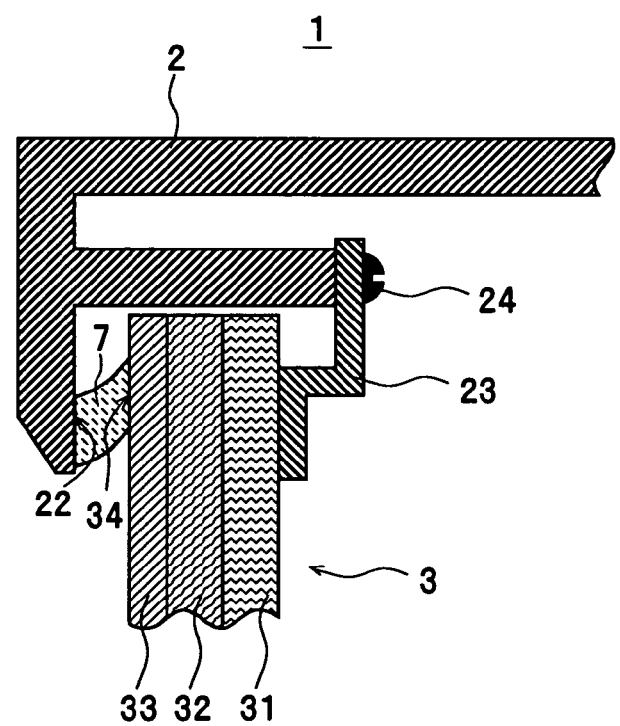
FIG. 3 is a side cross-sectional view showing the part shown in FIG. 2 in a state in which the sealing member is deformed.
Figure 4:
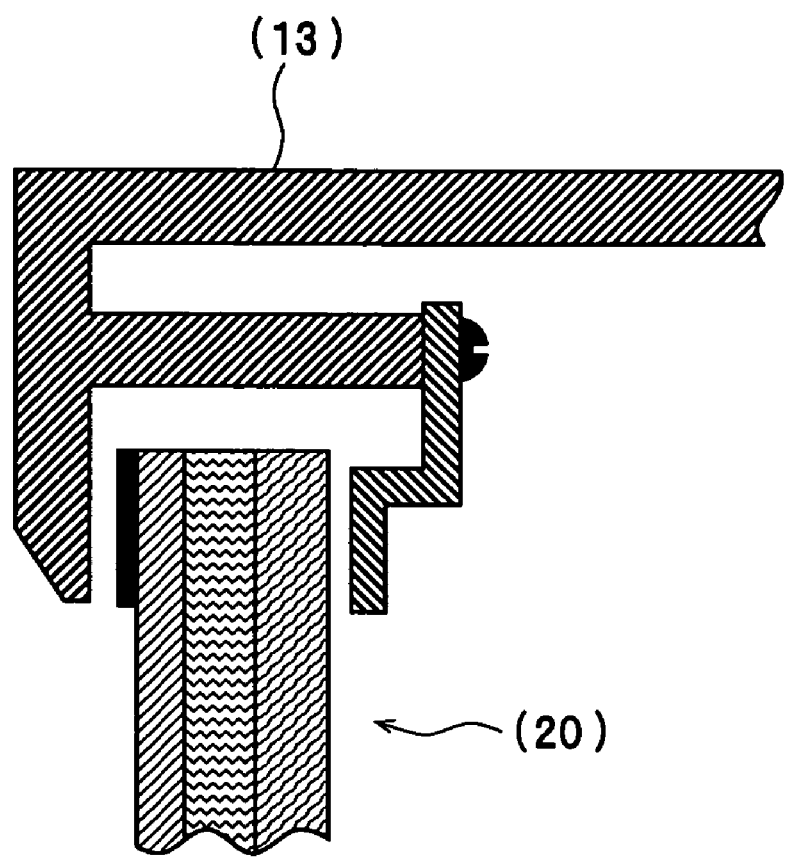
FIG. 4 is a side cross-sectional view showing the construction of part of a conventional rear projector, constituted by a housing and a screen panel.

In the meanwhile, within the cabinet 2, air is flowing due to air blow from the cooling fan 41. In this case, however, since the sealing member 7 is between the periphery 34 of the screen panel 3 and the opening edge portion 22 of the cabinet 2, air is prevented from flowing into the cabinet 2 through a gap between the periphery 34 and the opening edge portion 22 in accordance with the air flow within the cabinet 2, whereby entry of dust can be prevented. The screen panel 3 thermally expands progressively with the lapse of time, due to heat generated by projected the projection light L. In this case, the screen panel 3 having its lower side supported by the cabinet 2 as shown in FIG. 1 thermally expands upward and laterally. When the screen panel 3 thus expands, the sealing member 7, which is formed of the closed-cell sponge having a high elastic deformation rate, is deformed by the expansion of the screen panel 3, as shown in FIG. 3, in a state held in intimate contact with the periphery 34 of the screen panel 3 and the opening edge portion 22 of the cabinet 2. Therefore, it is possible to reliably prevent the sealing member 7 from being separated from the periphery 34 or the opening edge portion 22 to allow dust to enter the cabinet 2 through a gap formed by the separation.

As described above, according to the television 1, since the screen panel 3 is attached to the inner wall surface of the front side of the cabinet 2 in the sealing member 7 between the periphery 34 of the screen panel 3 and the opening edge portion 22 of the cabinet 2, even when the screen panel thermally expands, a gap is not formed between the screen panel 3 and the cabinet 2, which makes it possible to reliably prevent entry of dust into the cabinet 2 and hence deposition of dust on the projector unit 4 and the rear surface of the screen panel 3.

Further, since the sealing member 7 is formed of the closed cell sponge in which cells are separate from each other, it is possible to reliably prevent dust from passing through the cells into the cabinet 2. Furthermore, since the closed cell sponge has a high elastic deformation rate, even when the screen panel largely expands, the sealing member 7 is deformed while being held in intimate contact with the periphery 34 of the screen panel 3 and the opening edge portion 22 of the cabinet 2. Consequently, even when the screen panel largely expands, it is possible to reliably prevent the sealing member 7 from being separated form the periphery 34 or the opening edge portion 22 to allow dust to enter the cabinet 2 through a gap formed by the separation.

It should be noted that the present invention is by no means limited to the above embodiment. For example, although in the above embodiment, the sealing member 7 is formed of the closed cell sponge, the material of the sealing member is not limited to this, but it is possible to employ a closed-cell expanded resin other than the sponge, an open-cell expanded resin, or rubber, as a material of the sealing member. Further, the cross-section of each side portion of the sealing member 7 is not limited to the rectangular shape, but it may be circular or ellipsoidal, or alternatively the side portion may be in the form of a hollow pipe. Furthermore, although in the above embodiment, the description has been given of an example in which the control unit 6 includes the tuner, the IF circuit, the audio detection circuit, and the video detection circuit, these circuits are not necessarily needed, but the present invention can be applied to a rear projection monitor for displaying only images based on an image signal inputted from an external device. Further, the audio output section can be formed as a separate composition disposed outside the cabinet 2, or further, the present invention can be applied to a composition that is not provided with an audio output section, and displays only images.

What is claimed is:

1. A rear projector comprising:
   a housing that has a front side thereof formed with an opening defined by an opening edge portion of the housing, wherein the housing is one piece;
   a screen panel that is slightly larger in size than the opening of the housing, wherein the screen panel is directly mounted in the one piece housing and is attached to the front side of the housing such that the opening edge portion of the opening of the housing and a periphery of the screen panel are opposed to each other, the screen panel receiving projection light projected from a rear side thereof for image display, and thereby displaying an image thereon;
   a projection mechanism that is disposed within the housing, for projecting the projection light; and
   a dust-proofing elastic member that is disposed between the periphery of the screen panel and the opening edge portion, wherein the dust-proofing elastic member is formed of a closed-cell expanded resin, the screen panel being attached to the housing.

2. A rear projector comprising:
   a housing that has a front side thereof formed with an opening defined by an opening edge portion of the housing, wherein the housing is one piece;
   a screen panel that is slightly larger in size than the opening of the housing and attached to the front side of the housing such that the opening edge portion of the opening of the housing and a periphery of the screen panel are opposed to each other, the screen panel receiving projection light projected from a rear side thereof for image display, and thereby displaying an image thereon;
   a projection mechanism that is disposed within the housing, for projecting the projection light; and
   a dust-proofing elastic member that is disposed between the periphery of the screen panel and the opening edge portion.

3. The rear projector as claimed in claim 2, wherein the dust-proofing elastic member is formed of a closed-cell expanded resin.

4. The rear projector as claimed in claim 2, further comprising a holder that holds the screen panel from the rear side of the screen panel,
   wherein the opening edge portion has a first portion opposed to the screen panel, and has a second portion projected from the first portion to the rear side of the screen panel at the outer side of the periphery of the screen panel, and
   the holder is secured to the second portion so that the elastic member and the screen panel are clamped between the holder and the first portion.

5. The rear projector as claimed in claim 4, wherein the dust-proofing elastic member is formed of a closed-cell expanded resin.

* * * * *